United States Patent

[11] 3,622,096

| [72] | Inventor | Roger W. Young<br>Upper Montclair, N.J. |
|---|---|---|
| [21] | Appl. No. | 826,103 |
| [22] | Filed | May 20, 1969 |
| [45] | Patented | Nov. 23, 1971 |
| [73] | Assignee | John Dusenbery Company, Inc.<br>Clifton, N.J. |

[54] BALL BEARING CORE ADAPTER
8 Claims, 4 Drawing Figs.

[52] U.S. Cl. .................................................. 242/56.9,
242/68
[51] Int. Cl. .................................................. B65h19/22,
B65h 17/02
[50] Field of Search .......................................... 242/56.9,
75.4, 68

[56] References Cited
UNITED STATES PATENTS

| 3,322,361 | 5/1967 | Young | 242/56.9 |
| 2,563,542 | 8/1951 | Mackelduff | 242/75.4 X |
| 2,833,488 | 5/1958 | Kerber | 242/56.9 |
| 3,237,830 | 3/1966 | Oswald et al. | 242/56.9 X |

*Primary Examiner*—George F. Mautz
*Attorney*—Rudolph J. Jurich

ABSTRACT: A core adapter for supporting a tubular core on a mandrel has a cylindrical body supported on the mandrel by a plurality of ball bearings. The core is secured to the body and the bearings are maintained under axial stress to control the slippage between the body and the mandrel as a tape is wound on the core.

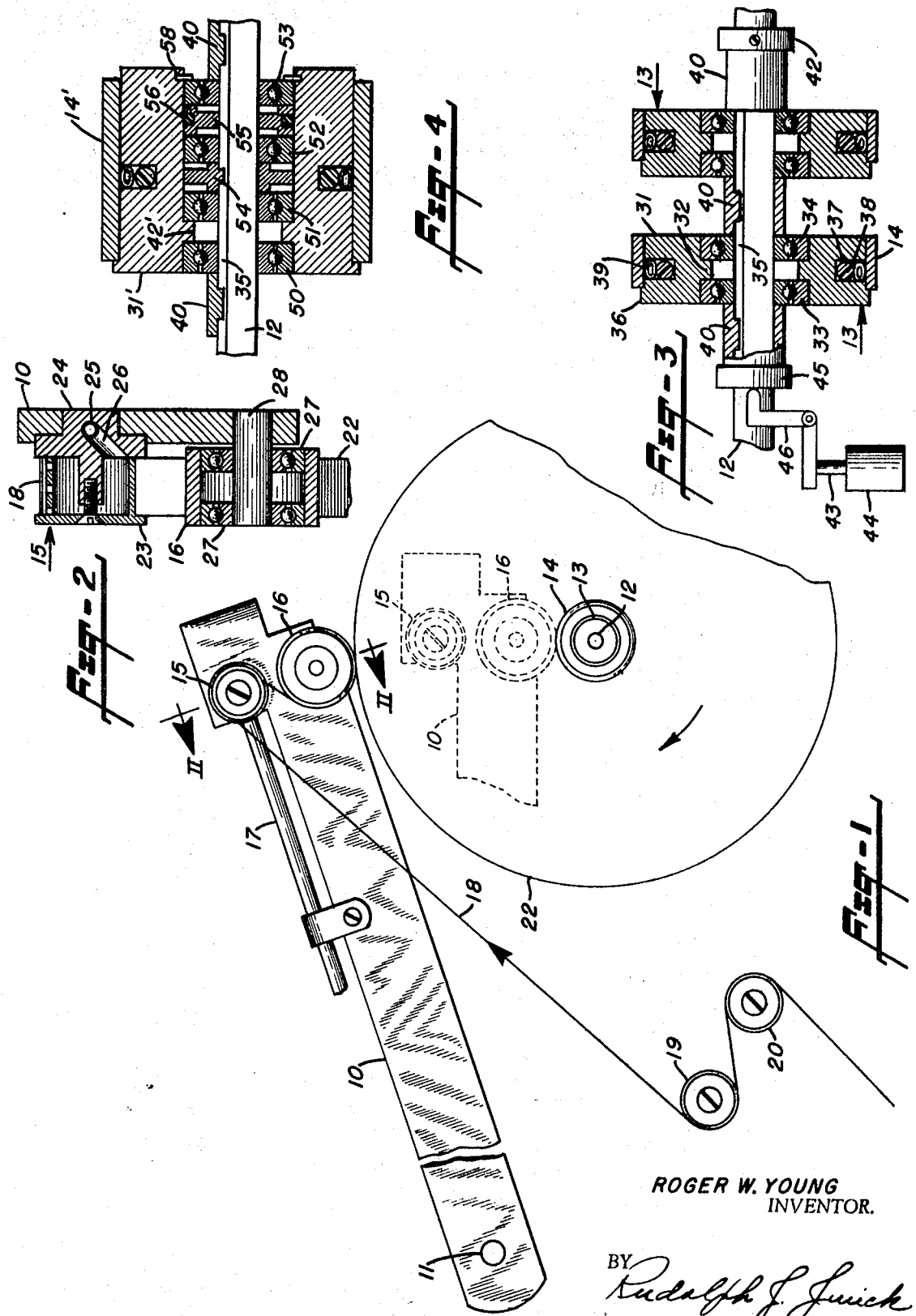

BALL BEARING CORE ADAPTER

BACKGROUND OF THE INVENTION

In slitting and rewinding machines, a relatively wide web of material is slit into narrow strips, which strips are then rewound into rolls on individual cores mounted on a power-driven mandrel. In order to provide a smooth, uniformly wound roll, a certain amount of tension must be maintained on each individual strip during the entire winding operation. This is accomplished by rotating the mandrel at a higher speed than the cores.

A variable factor which effects the rewinding of the cut strips is the normal variation in gauge, or thickness of the particular material. Such variation results in the diameter of some rewound rolls increasing a different rate than others, which often results in rolls of inferior quality. To overcome this problem, it is the practice to utilize an arrangement wherein each core can slip, relative to the mandrel, in correspondence with the tension of the associate strip and independently of the slippage of the other cores. This is done by supporting each core on a core adapter and inserting spacer rings over the mandrel and between each adapter. The spacer rings are keyed to the mandrel and the assembly of adapters and spacer rings is clamped, axially, by suitable loading means carried by the mandrel. Thus, the spacer rings are positively driven by the mandrel while each adapter is free to slip as the tension of the associated strip exceeds the frictional restraining force exerted against opposite faces of the adapter by the spacer rings.

In the case of very thin, narrow strips, the amount of tension which can be applied to the strips during the rewinding operation cannot exceed a relatively low, maximum value, otherwise the strip may be stretched and/or torn, particularly when the machine desirably is operated at high speeds. Conventional core adapters are satisfactory for use with relatively thick material. However, such adapters are not satisfactory for use in rewinding narrow, thin films, such as, for example, audio recording tape having a width of one-eighth inch and a thickness of the order of 0.0004 inch and requiring winding tensions measured in ounces. It is also desirable, particularly in high-speed rewinding machines, that the core adapters be easily and quickly assembled on and dissembled from the mandrel and that the core be quickly and securely attachable to the adapter and detachable therefrom. Still further, the relative slippage of the core relative to the mandrel should be smoothly controllable and remain substantially constant irrespective of the mandrel speed.

A ball bearing core adapter made in accordance with this invention overcomes the shortcomings of existing adapters and is particularly useful in high-speed rewinding of thin tape wherein the tension to be maintained on the tape during the winding operation is of the order of a few ounces.

SUMMARY OF THE INVENTION

Ball bearings are disposed within a central hole extending through a cylindrical body provided with means for securing a tubular core thereto. The outer race of at least one bearing is frictionally coupled to the body and the inner race or races are slidable along a mandrel. The mandrel carries means for maintaining opposed, axial pressure on the inner and outer races, which pressure is adjustable to provide a desired stressed condition of the bearings, thereby to control the tension on the tape as it is wound on the core.

An object of this invention is the provision of an improved core adapter for supporting a tubular core on a mandrel and maintaining a winding tension of the order of ounces on a strip of thin tape as it is wound on the core.

An object of this invention is the provision of a core adapter rotatably supported on a mandrel by ball bearings which are maintained under axial stress.

An object of this invention is the provision of a core adapter comprising a cylindrical body supported on a mandrel by a plurality of ball bearings, said body having means for frictional coupling to a core and said mandrel carrying means for applying opposed, axial pressure to the inner and outer races of the bearings for the purpose of controlling the winding tension of a strip of material as it is wound on the core.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views:

FIG. 1 is a diagrammatic representation, in side elevation, showing an arrangement for winding a thin film on a core;

FIG. 2 is an enlarged, cross-sectional view taken along the line II—II of FIG. 1;

FIG. 3 is an enlarged central, cross-sectional view showing a core adapter made in accordance with one embodiment of this invention; and FIG. 4 is an enlarged cross-sectional view of a core adapter made in accordance with another embodiment of this invention.

DESCRIPTION OF PREFERRED EMBODIMENTS

Reference now is made to FIG. 1 showing a guide arm 10 freely rotatable about a shaft 11 disposed parallel to a mandrel 12, which mandrel carries a core adapter 13 and a core 14. Secured to the guide arm, at the free end thereof, is an air bearing 15 and a contact roller 16, air under pressure being supplied to the air bearing through the tube 17. Before the start of the winding operation, the thin film, or tape 18, coming from one or more pull rolls 19, 20, is passed over the air bearings 15 and around the contact roller 16, and the tape end is affixed to the core 14, as by adhesive tape. The mandrel 12 is then rotated by a motor and the tape is wound into a roll 22. In order to maintain a uniform winding tension on the tape the core adapter 13 is constructed and arranged to provide a predetermined, relative slippage between the roll 22 and the mandrel, as will be described hereinbelow. In addition to winding the roll at a uniform tension, it is desirable to provide a roll having smooth sides, that is, wherein the edges of the convolutions lie in a common plane. This is accomplished by the air bearing and contact roller.

As shown is FIG. 2, the air bearing 15 comprises a flanged, cuplike member 23, having openings formed in the sidewall proximate to the tape 18 and secured to the central boss of a metal bushing 24 which is force fitted into a hole formed in the guide arm 10. The end of the flexible tube 25 passes through a radial hole formed in the bushing 24 and is secured in place by cement. This tube communicates with the hole 26, of the bushing, and is connected to the air tube 17 visible in FIG. 1. Thus, an air passageway is provided to the interior of the cuplike member 23. Consequently, that portion of the tape passing over the air bearing is supported by a film of air. The contact roller 16 is press fitted over a pair of ball bearings 27 having inner races press fitted over a rod 28 secured to the guide arm. The guide arm preferably is positioned to lie in a plane such that the side edge of the tape is in positive engagement with the bushing 24. Since the tape, at this point, is supported on a film of air, the effective pressure of the strip against the bushing, during the winding operation, is minimal, thereby eliminating curling over of the tape edge. Thus, the air bearing maintains the tape in a precise path of travel as it passes over the contact roller and onto the core. The flange on the air bearing serves as a guide for the tape during the winding operation.

The above-described air bearing arrangement is disclosed in my U.S. Pat. No. 3,387,798, June 11, 1968 and is particularly adapted for use in combination with my novel core adapter for high-speed winding of thin films.

Reference now is made to the central, cross-sectional view of FIG. 3 showing a core adapter made in accordance with one embodiment of the invention. A central hole formed in a cylindrical body 31 terminates in enlarged diameter bores, thereby forming an inner, annular flange 32. A pair of ball bearings 33, 34 are press fitted into the bores with the outer races of the bearings in face engagement with the flange 32. The inner races of the bearings are slidable on the mandrel 12 provided with a keyway 35. The body 31 includes an outwardly extending flange 36 and has an annular groove 37 formed in the peripheral surface. A resilient O-ring 38 is positioned in the bottom of the groove and supports a closely coiled garter spring 39. Normally, the outer periphery of the garter spring extends beyond the groove. The core 14 is pressed over the garter spring to a position where the end of the core abuts the flange 36. Through the compression of the garter spring and the resilient O-ring, the spring exerts a constant radical pressure on the inner wall of the core. Although the expanding forces of the spring and O-ring are relatively small, the multiplicity of spring coils prevents the core from rotating on the body. At the same time, a new core is easily and quickly attached to the adapter and the wound core is easily removed therefrom. The described garter spring arrangement is disclosed in U.S. Pat. No. 2,833,488, May 6, 1958, F. J. Kerber and constitutes one practical means for securing a core to my novel core adapter.

A plurality of core adapters are mounted on the mandrel. Interposed between the adapters are spacer rings 40 which are keyed to the mandrel for simultaneous rotation therewith. Those skilled in this art will understand that the axial length of the spacer rings is such as to space the adapters apart an appropriate distance for operation on a duplex slitting and winding machine. A desired axial pressure can be applied to the spacer rings by suitable loading means carried by the mandrel. As shown in FIG. 3, the loading means comprises a collar 42, secured to one end of the mandrel by a plurality of setscrews, and the piston 43 of a hydraulic cylinder 44 which is secured in fixed position on the machine frame. By regulating the fluid pressure in the cylinder, a desired axial pressure is applied to the thrust bearing 45 through the lever 46 pivotally mounted on the machine frame and having a bifurcated end spanning the mandrel. This axial pressure is applied to all of the spacer rings and the inner races of the ball bearings of the adapters. Since the outer races of the bearings 33 and 34 are in face contact with the flange 32, the axial pressure applied to the inner races maintains the bearing balls under axial stress, thereby requiring an above-normal torque to be applied to the body 31 in order to effect relative rotation between the body and the mandrel. The coefficient of friction between the body 31 and the outer races of the bearings is much greater than that between the bearing balls and the races. During the winding operation, the tape is supplied to the core at a constant speed, determined by the speed of rotation of the pull rolls, and the core tends to rotate at the excessive speed of the mandrel. This applies a winding tension to the tape, the magnitude of such tension being determined by the axial pressure applied to the bearing races. Axial pressures of hundreds of pounds can be applied to the races of the bearings, by means of the piston 43, and such pressures are translated into a winding tension of the order of one ounce.

Increased winding tension can be applied to the tape by an adapter constructed and arranged as shown in FIG. 4. The cylindrical body 31' is of increased thickness to accommodate the four ball bearings 50–53. The bearings 50 and 51 may be press fitted into the central hole of the body, with the outer races of these bearings in face contact with the internal flange 42' On the other hand, the bearings 52 and 53 are slidable on the mandrel 12. Disposed between the bearings 51, 52 and 53 are metal ring members 54 and 55 having inside diameters somewhat larger than the mandrel diameter and cross-sectional configurations for transmitting an axial force to adjacent bearing races. More specifically, the ring member 54 has an enlarged inner portion for face contact only with the inner races of the bearings 51 and 52. Such ring member also includes an integral key slidable in the keyway 35. The ring member 55 has an enlarged outer portion for face contact only with the outer races of the bearings 52 and 53. Such ring member is provided with a peripheral groove and carries an O-ring 56, while O-ring permits lateral movement of the ring member while exerting a torque on the body member 31'. A retaining ring 58 retains the bearings 52 and 53 within the body member. Since the bearing 50 is press fitted into the central hole of the body and the ring members 54 and 55 have outside diameters corresponding to that of the central hole, the core adapter is removable from, and inserted on the mandrel as an assembled unit for the purpose of attaching a core 14' thereto. When a plurality of the adapters and the spacer rings 40 are assembled on the mandrel 12, and a clamping pressure is applied, as has been described with reference to FIG. 3, an axial pressure is applied to the inner races of the bearings engaged by the spacer rings. The axial pressure applied to the inner race of the bearing 50 is applied to one face of the flange 42' through the ball bearings and the outer race. The pressure applied to the opposite face of this flange is transmitted thereto through the inner and outer races of the bearings, the bearing balls and the interposed ring members 54 and 55. Core adapters of this construction are suitable for use with longer cores and provide a winding tension on the tape of the order of ounces.

Having now described the invention, what I desire to secure by Letters Patent of the United States is set forth in the following claims.

I claim:

1. A core adapter for mounting a tubular core on a mandrel comprising,
   a. a cylindrical body member having a central hole extending therethrough, said body member having an annular flange projecting into said hole,
   b. first and second ball bearings disposed within said hole on opposite sides of said flange, said flange being engageable only by the outer races of the bearings and the inner races of the bearings having a diameter exceeding that of the mandrel, and
   c. means carried by the said body member for securing the core to the body member.

2. The invention as recited in claim 1, wherein the said means for securing the core to the body member comprises an annular groove formed in the peripheral surface of the body member, an annular resilient member disposed in said groove, and a coiled spring in said groove and supported by said resilient member, the coils of said spring normally extending radially beyond the peripheral surface of the body member.

3. The invention as recited in claim 1, wherein the said bearings are press fitted into the said hole.

4. The invention as recited in claim 1, including third and fourth ball bearings axially spaced from each other and from the second bearing, a first ring member positioned between the second and third bearings and engageable only by the inner races of said second and third bearings, a second ring member positioned between the third and fourth bearings and engageable only by the outer races of said third and fourth bearings, and means retaining all of the bearings in the said central hole.

5. The invention as recited in claim 4, including an annular resilient member disposed within a groove formed in the peripheral surface of the said second ring member, said resilient member being in engagement with the wall defining the said central hole.

6. In combination,
   a. a mandrel having a keyway,
   b. a cylindrical body member having a central hole extending therethrough and an annular flange projecting into said hole,
   c. a pair of ball bearings disposed within said hole on opposite sides of said flange and having inner races slidable on the mandrel, said flange having a diameter such that it is engageable only by the outer races of the bearings, d. means carried by the body member for securing a tubular core to the body member, and
e. means carried by the mandrel and maintaining the inner races of the bearings under axial pressure.

7. The invention as recited in claim 6, wherein said means for securing the core to the body member comprises an annular, resilient member disposed within a circular groove formed in the peripheral surface of the body member, and a coiled spring disposed in said groove and supported by said resilient member, the coils of said spring normally extending radially beyond said peripheral surface of the body member.

8. The invention as recited in claim 6, wherein the means maintaining the inner races of the bearings under axial pressure includes a spacer ring on each side of the body member and keyed to the mandrel.

* * * * *